United States Patent Office 3,560,467
Patented Feb. 2, 1971

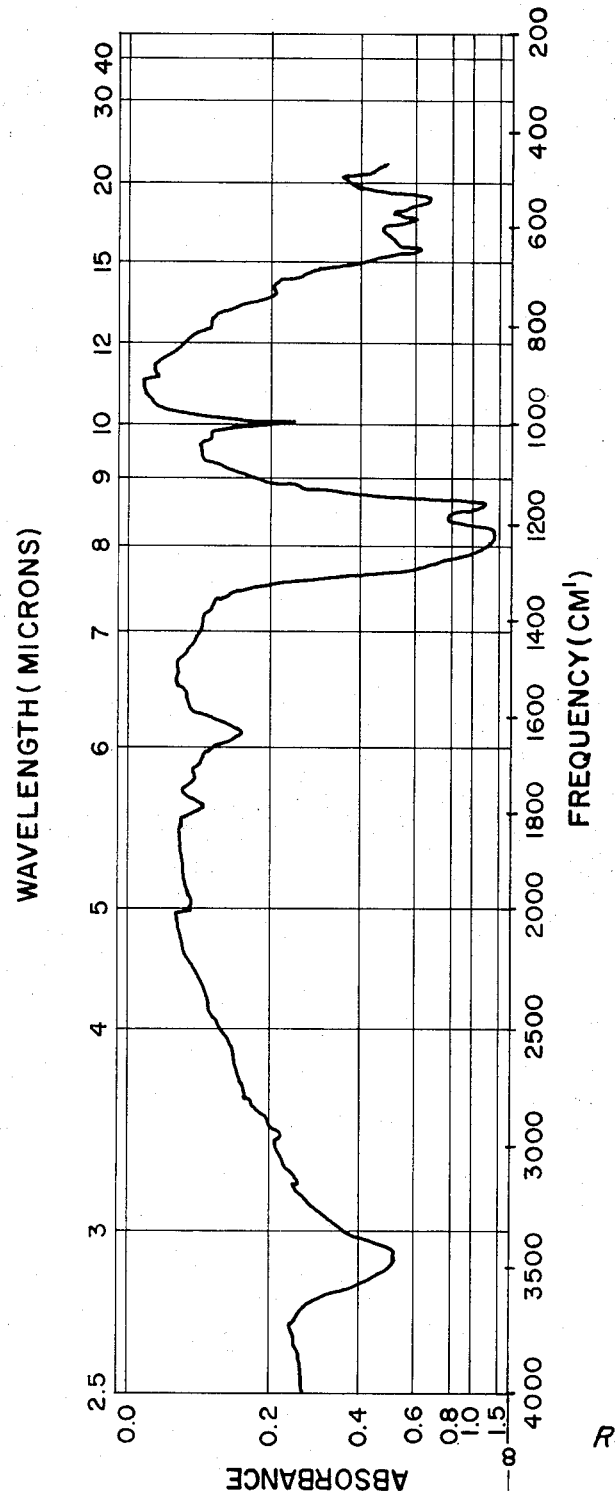

3,560,467
COPOLYMERS OF PERFLUOROISOPROPYLIDENI-MINE WITH TETRAFLUOROETHYLENE
Robert A. Falk, Rockaway, N.J., assignor to Thiokol Chemical Corporation, Bristol, Pa., a corporation of Delaware
Filed Nov. 7, 1968, Ser. No. 774,160
Int. Cl. C08g 33/02
U.S. Cl. 260—92.1            11 Claims

ABSTRACT OF THE DISCLOSURE

Perfluoroisopropylidenimine and tetrafluoroethylene are copolymerized by irradiation with gamma rays. The copolymer has a molecular weight of at least about 1400 and a molecular structure which consists predominantly of polytetraethylene groups and may be represented by the formula

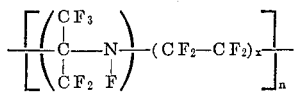

wherein $x$ and $n$ are integers greater than 1. The copolymer melts to a free-flowing liquid and is useful for making plastic articles by extrusion or injection molding means.

CROSS REFERENCE TO RELATED APPLICATION

Preparation and characterization of the monomer perfluoroisopropylidenimine, $(CF_3)_2C=NF$, is disclosed and claimed in copending application Ser. No. 774,161, filed Nov. 7, 1968, incorporated herein by reference.

BACKGROUND OF THE INVENTION

Field of the invention

The invention relates to polymers prepared from perfluoroisopropylidenimine and at least one other vinylic monomer, preferably tetrafluoroethylene.

Description of the prior art

The compound perfluoroisopropylidenimine is a novel monomeric compound, as is disclosed in the copending application referred to above. Vinylic monomers are well-known. Polymers of perfluoroisopropylidenimine have not previously been known, either in homopolymeric or copolymeric form.

SUMMARY OF THE INVENTION

The present invention relates to the discovery that perfluoroisopropylidenimine can be polymerized, particularly as a copolymer with a vinylic monomer, to form an extrudable and moldable plastic material useful for making plastic articles or coatings, such as bottles or wire-sheathing.

The invention is illustrated by the copolymer of perfluoroisopropylidenimine with tetrafluoroethylene.

BRIEF DESCRIPTION OF THE DRAWING

The drawing shows the infrared spectrum of the copolymer of perfluoroisopropylidenimine with tetrafluoroethylene.

DESCRIPTION OF THE PREFERRED EMBODIMENTS

The monomer perfluoroisopropylidenimine, $(CF_3)_2C=NF$ may be prepared by reacting $CF_2=CFCF_3$ with IF to form $(CF_3)_2CFI$, then reacting the $(CF_3)_2CFI$ with $N_2F_4$ to form $(CF_3)_2CFNF_2$, and then defluorinating the latter compound with ferrocene to $(CF_3)_2C=NF$, as disclosed and claimed in said copending application.

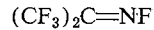

may also be prepared by fluorination of $(CF_3)_2C=NH$ as taught by John Ruff, J. Org. Chem., vol. 32, pages 1675–77, 1967.

The monomer $(CF_3)_2C=NF$ has been found to copolymerize with known vinylic comonomers. Vinylic comonomers used in practice of the invention include known comonomers which have at least one double bond and which form copolymers with $(CF_3)_2C=NF$ by addition polymerization. Such vinyl type monomers include, but are not limited to, the following monomers: vinyl chloride; vinyl fluoride; vinyl acetate; vinylidene chloride; vinylidene fluoride; vinyl alcohol; vinyl acetals, e.g. vinyl butyral fluoroolefins, e.g. tetrafluoroethylene, monochlorotrifluoroethylene; acrylic monomers, e.g. methyl methacrylate, ethyl acrylate and acrylonitrile; diolefins, e.g. butadiene-1,3, isoprene, and 2-chlorobutadiene-1,3; monoolefins, e.g. ethylene, propylene and isobutylene; and styrene.

Polymerization can be carried out in the manner usually used to copolymerize a comonomer with another vinylic monomer. Polymerization methods include bulk, suspension, emulsion, and solution type methods, in which polymerization is catalyzed by the usual catalysts, e.g. organic peroxides, inorganic peroxides, and irradiation, under the known usual polymerization conditions. The copolymers of $(CF_3)_2C=NF$ and the vinylic comonomer may be expected to have predominantly the properties of the polymerized comonomer, but modified therefrom.

The invention is further illustrated by the following examples wherein $(CF_3)_2C=NF$ is copolymerized with tetrafluoroethylene and the copolymer is used to prepare a copolymer-coated conductive wire.

EXAMPLE I

Perfluoroisopropylidenimine (0.33 g., 1.8 mmoles) and tetrafluoroethylene (0.12 g., 1.2 mmoles) were condensed into a 30 ml. stainless steel Hoke cylinder and irradiated in a $Co^{10}$ gamma source (0.4 Mrads/day) to 2.4 Mrads. The residual gas was essentially $(CF_3)_2C=NF$, with no $C_2F_4$ present. The polymeric product was a white powder of polytetrafluoroethylene-like appearance, but its infrared spectrum had several bands not present in polytetrafluoroethylene at 7.8, 9.8, 11.2 and 13.8$\mu$, and an exceedingly sharp band at 10.1$\mu$. The radiation-initiated copolymerization was repeated using a 10:1 parts by weight of $(CF_3)_2C=NF:CF_2=CF_2$ charge and a radiation dosage of 2.0 Mrads with almost identical results.

The copolymer product from each run softens at 230° C. and melts completely to a clear free-flowing liquid at 270–280° C. By comparison, polytetrafluoroethylene prepared in the same manner as the copolymer was prepared sinters at 321–323° C.

The copolymer was examined by differential thermal analysis (DTA) and found to have an endotherm at 260–280° C. and an exotherm at 280–310° C. By comparison, polytetrafluoroethylene has an endotherm at 320–330° C. and an exotherm at 470–550° C.

The above copolymer was found on analysis to contain 1.1% by weight of nitrogen. The composition thus corresponds to a copolymer having a molecular weight of at least about 1400 and containing one perfluoroisopropylidenimine unit to twelve tetrafluoroethylene units, as follows:

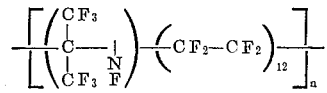

wherein $n$ is an integer greater than 1.

EXAMPLE II

The copolymer of perfluoroisopropylidenimine and tetrafluoroethylene of Example I is placed in a plastic extruder machine equipped with wire coating dies and is extruded around 12 guage aluminum wire in the usual way, as described, for example, in Christofas et al. patent, U.S. 3,402,427.

An electrically conductive wire sheathed in copolymer of perfluoroisopropylidenimine-tetrafluoroethylene is thus prepared. The wire then is used in making electrical connections from a source of alternating current to a light bulb. The copolymer can also be used for sheathing fine copper wires used in making electrical connections in a computer.

EXAMPLE III

The copolymer of perfluoroisopropylidenimine and tetrafluoroethylene of Example I is placed in an apparatus for simultaneously blow molding and compression molding plastic containers, of the type taught, for example, in John's patent U.S. 3,398,427. A mold in the form of a bottle with a threaded outlet neck for receiving a screw cap is used in the apparatus. A bottle having the shape of the mold is formed from the copolymer of the invention. A screw-cap of the same copolymer may likewise be formed. The plastic bottle so formed and closable may be used for storage of corrosive liquids, e.g. aqueous solutions of hydrogen fluoride.

Other copolymers of perfluoroisopropylidenimine can likewise be prepared with a vinylic comonomer and processed and used in a like manner to manufacture useful plastic articles and coatings.

Many modifications and variations of the present invention will be obvious to those skilled in the polymerization and plastics processing and manufacturing arts. It is therefore to be understood that such other modifications and variations that fall within the scope of the claims hereof are intended to be included therein.

I claim:
1. Copolymer of perfluoroisopropylidenimine with a vinylic comonomer.
2. Copolymer of perfluoroisopropylidenimine according to claim 1 wherein the comonomer is selected from vinyl chloride, vinyl fluoride, vinyl acetate, vinylidene chloride, vinylidene fluoride, vinyl alcohol, vinyl butyral, vinyl methyl ether, tetrafluoroethylene, monochlorotrifluoroethylene, methyl methacrylate, ethyl acrylate, acrylonitrile, butadiene-1,3, isoprene, 2-chlorobutadiene-1,3, ethylene, propylene, isobutylene and styrene.
3. Copolymer according to claim 1 wherein the comonomer is tetrafluoroethylene.
4. Copolymer represented by the formula

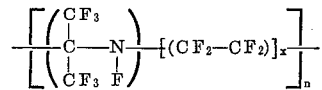

having a molecular weight of at least about 1400 and wherein $x$ and $n$ are integers greater than 1.

5. Copolymer of claim 4 wherein $x$ is about 12.
6. A plastic article comprising copolymer of perfluoroisopropylidenimine with a vinylic comonomer.
7. The plastic article of claim 6 wherein the vinylic comonomer is tetrafluoroethylene.
8. A molded plastic container comprising copolymer of perfluoroisopropylidenimine with a vinylic comonomer.
9. The molded plastic container of claim 8 wherein the vinylic comonomer is tetrafluoroethylene.
10. A wire coated with copolymer of perfluoroisopropylidenimine with a vinylic comonomer.
11. The coated wire of claim 10 wherein the vinylic comonomer is tetrafluoroethylene.

References Cited

UNITED STATES PATENTS 3,399,234    8/1968    Zollinger _____ 260—566

JOSEPH L. SCHOFER, Primary Examiner

J. A. DONAHUE, JR., Assistant Examiner

U.S. Cl. X.R.

260—89.1, 89.5, 91.3, 91.7, 92.8, 93.3, 93.5, 94.2, 94.9; 117—128.4